「(12) United States Patent
Nishida

(10) Patent No.: US 9,584,679 B2
(45) Date of Patent: Feb. 28, 2017

(54) INFORMATION PROCESSING APPARATUS, CONTROL METHOD THEREFOR, AND MEDIUM

(71) Applicant: CANON KABUSHIKI KAISHA, Tokyo (JP)

(72) Inventor: Takahiko Nishida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/977,003

(22) Filed: Dec. 21, 2015

(65) Prior Publication Data

US 2016/0205276 A1 Jul. 14, 2016

(30) Foreign Application Priority Data

Jan. 14, 2015 (JP) ................. 2015-005289

(51) Int. Cl.
*H04N 1/00* (2006.01)
*G06F 3/12* (2006.01)

(52) U.S. Cl.
CPC ....... *H04N 1/00244* (2013.01); *G06F 3/1204* (2013.01); *G06F 3/1226* (2013.01); *G06F 3/1236* (2013.01); *G06F 3/1245* (2013.01); *G06F 3/1287* (2013.01); *G06F 3/1288* (2013.01)

(58) Field of Classification Search
CPC . H04N 1/00244; G06F 3/1204; G06F 3/1226; G06F 3/1236; G06F 3/1245; G06F 3/1287; G06F 3/1288

USPC ....................... 358/1.1, 1.13, 1.15
See application file for complete search history.

(56) References Cited

U.S. PATENT DOCUMENTS

| | | | | |
|---|---|---|---|---|
| 6,535,293 | B1* | 3/2003 | Mitsuhashi | G06K 15/02 358/1.13 |
| 7,852,497 | B2* | 12/2010 | Sato | G06F 3/1205 358/1.1 |
| 8,773,694 | B2* | 7/2014 | Takagi | G06F 3/1205 358/1.15 |
| 8,780,377 | B2 | 7/2014 | Nishida et al. | |
| 8,976,398 | B2 | 3/2015 | Kishida | |
| 2002/0097432 | A1* | 7/2002 | Kumashio | G06F 3/1205 358/1.15 |
| 2003/0182378 | A1* | 9/2003 | Treptow | H04L 12/58 709/206 |
| 2004/0252339 | A1* | 12/2004 | Toda | G06F 3/1214 358/1.16 |
| 2012/0229833 | A1* | 9/2012 | Nakagawa | H04N 1/0097 358/1.13 |

FOREIGN PATENT DOCUMENTS

| | | |
|---|---|---|
| JP | 2004-213111 A | 7/2004 |
| JP | 2006-209309 A | 8/2006 |
| JP | 2012-243089 A | 12/2012 |

* cited by examiner

*Primary Examiner* — Allen H Nguyen
(74) *Attorney, Agent, or Firm* — Fitzpatrick, Cella, Harper & Scinto

(57) ABSTRACT

A client terminal is provided with a print proxy which converts a request from a standard port monitor into a request to a print server and relays the request. This makes it possible to use an extension function between the client terminal and the print server in a system in which only the standard port monitor operates.

7 Claims, 8 Drawing Sheets

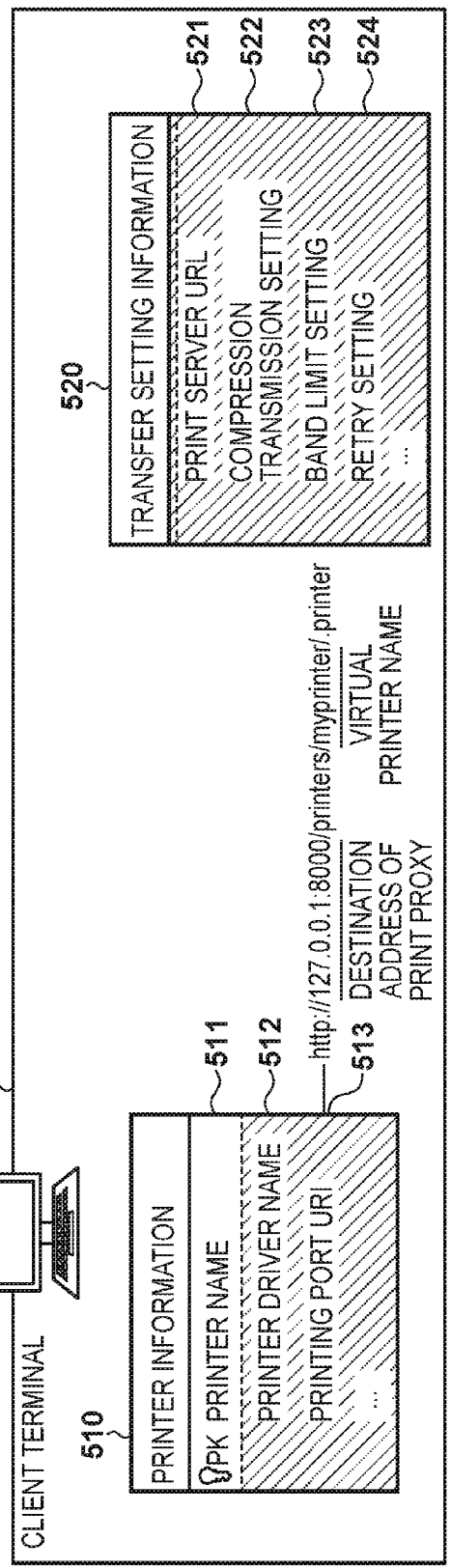
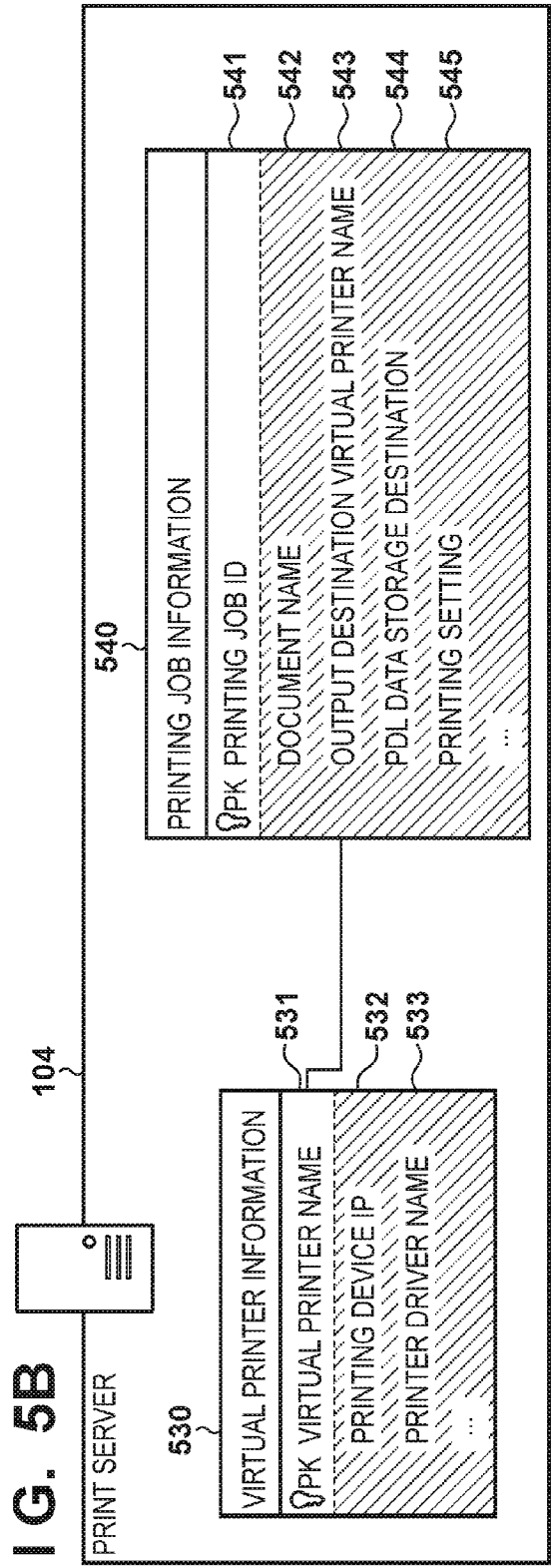

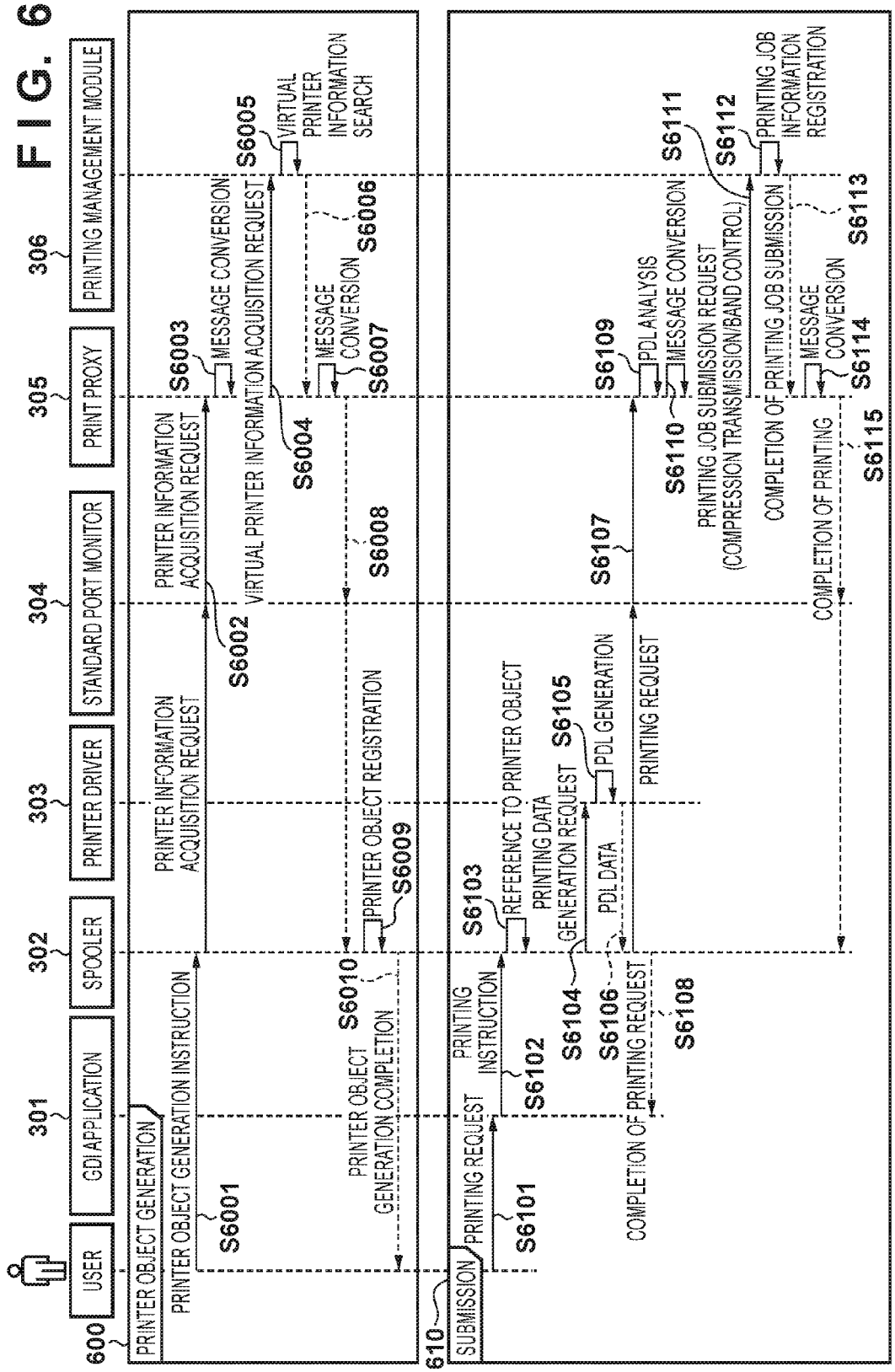

FIG. 7A

| VIRTUAL PRINTER NAME (531) | PRINTING DEVICE IP (532) | PRINTER DRIVER NAME (533) | ... |
|---|---|---|---|
| saveprinter | – | – | ... |

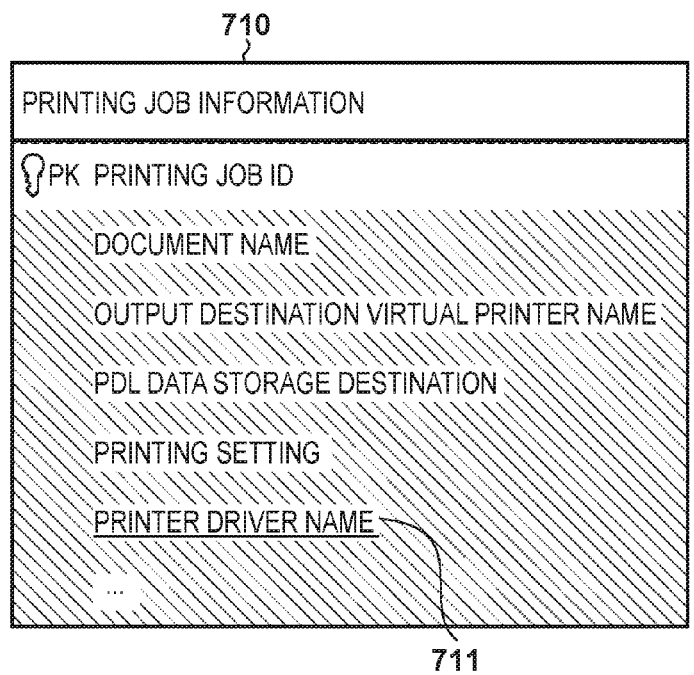

710

PRINTING JOB INFORMATION

PK  PRINTING JOB ID

DOCUMENT NAME

OUTPUT DESTINATION VIRTUAL PRINTER NAME

PDL DATA STORAGE DESTINATION

PRINTING SETTING

PRINTER DRIVER NAME — 711

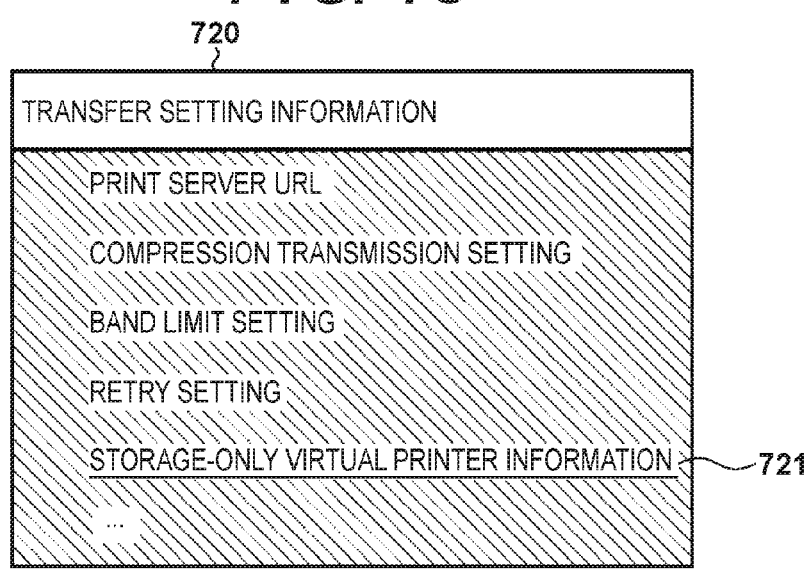

720

TRANSFER SETTING INFORMATION

PRINT SERVER URL

COMPRESSION TRANSMISSION SETTING

BAND LIMIT SETTING

RETRY SETTING

STORAGE-ONLY VIRTUAL PRINTER INFORMATION — 721

...

INFORMATION PROCESSING APPARATUS, CONTROL METHOD THEREFOR, AND MEDIUM

BACKGROUND OF THE INVENTION

Field of the Invention

The present invention relates to an information processing apparatus, a control method therefor, and a medium.

Description of the Related Art

In general, when executing printing processing on a system on which an OS (Operating System) operates, the user issues a printing instruction upon designating a standard port monitor incorporated in the OS in advance. The standard port monitor works to transmit printing data generated by a printer driver to a printing apparatus. Even in a large-sized print system including a print server, the user can submit a printing job to the print server by issuing a printing instruction to a virtual printer managed on the print server upon designating the standard port monitor. However, the standard port monitor only has a simple function of transmitting printing data and does not have functions such as a communication control function at the time of transmission. This leads to an error such as a temporal communication interruption during transmission. Under the circumstances, there is known a method of performing more stable submission processing by preparing a custom port monitor implementing communication control, retry processing, and the like on a print server and making the user designate the custom port monitor when issuing a printing instruction.

Some system environments newly provided by an OS, however, may allow only the standard port monitor of the OS to operate. For example, in Microsoft Windows 8® environments, the new printer driver architecture has been adopted, which is designed to inhibit the registration of the custom port monitor in a Windows® system. Such a system cannot implement extension functions such as communication control and retry processing, which has been implemented by a custom port monitor.

In such a system provided with only standard functions, there is available a technique disclosed in Japanese Patent Laid-Open No. 2012-243089 as a technique for implementing extension functions such as printing data transmission and printing job control. According to Japanese Patent Laid-Open No. 2012-243089, a client terminal acquires information of a printing device (for example, a printer), and a printer driver installs a printer adapter corresponding to the printing device and activates it, thereby implementing a function of an extension printer driver using bidirectional communication.

The technique disclosed in Japanese Patent Laid-Open No. 2012-243089, however, needs to provide support for each printer driver. A print system using a variety of printing devices including past models, in particular, has difficulty in providing support for all the printer drivers to be used. It therefore requires much cost to develop corresponding techniques and perform updating.

SUMMARY OF THE INVENTION

The present invention has been made in consideration of the related art described above and provides extension functions without tailoring printer drivers in a system in which only the standard port monitor operates.

The present invention has the following arrangement.

According to one aspect of the present invention, there is provided an information processing apparatus which communicates with a print server which manages a printer, the apparatus comprising: a receiver configured to receive, via a spooler, printing data generated by a printer driver corresponding to a printer object managed by information of a virtual printer corresponding to the print server, when performing printing by using the printer object; a specifying unit configured to specify job information including document information from the received printing data; and a controller configured to control transmission of the printing data and the specified job information with respect to the print server, wherein the controller performs at least one of compression transmission of the printing data, band limitation control of a network between the information processing apparatus and the print server, and retry processing for printing.

According to the present invention, it is possible to provide extension functions without tailoring printer drivers in a system in which only the standard port monitor operates.

Further features of the present invention will become apparent from the following description of exemplary embodiments with reference to the attached drawings.

BRIEF DESCRIPTION OF THE DRAWINGS

FIGS. 5A and 5B are block diagrams each showing an example of the arrangement of various types of information managed by a print system;

FIG. 6 is a sequence chart showing procedures for printer creation and submission processing;

FIGS. 7A, 7B, and 7C are views each showing an example of the arrangement of various types of information according to the second embodiment.

DESCRIPTION OF THE EMBODIMENTS

Embodiments for carrying out the present invention will be described below with reference to the accompanying drawings.

[First Embodiment]

<System Arrangement>

Figure 1:
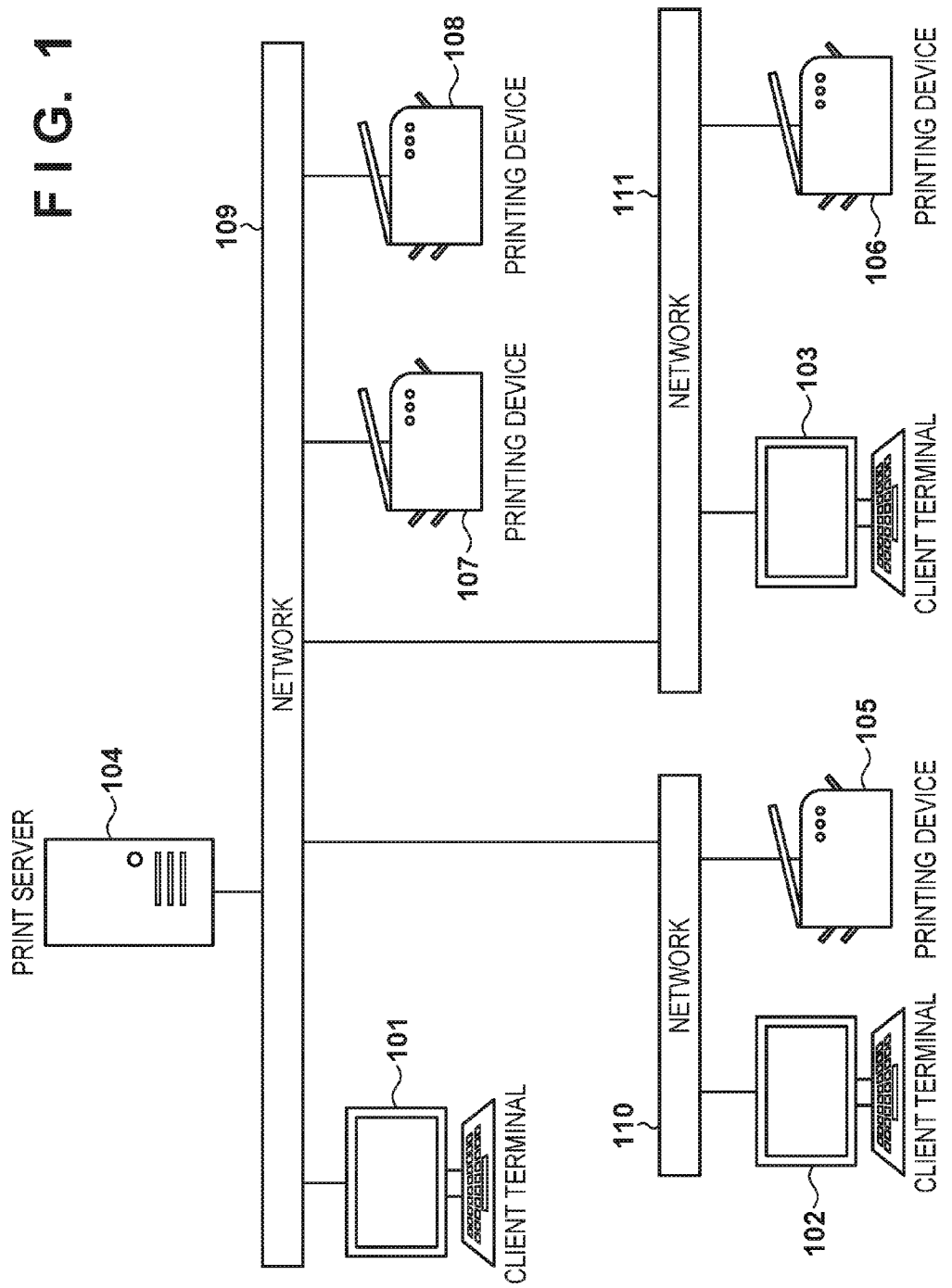
FIG. 1 is a block diagram showing a network arrangement.

FIG. 1 is a block diagram showing the overall arrangement of a print system according to an embodiment of the present invention. Referring to FIG. 1, client terminals 101 to 103, a print server 104, and printing devices 105 to 108 are connected to each other via networks 109 to 111. The client terminals 101 to 103 and the print server 104 each are implemented by an information processing apparatus such as a computer. Referring to FIG. 1, the above two types of components connected to each other, that is, the client terminals 101 to 103 and the printing devices 105 to 108, both include a plurality of components. However, either or both of the two types each may include a single component. The networks 109 to 111 are so-called communication networks capable of transmitting and receiving data, and may be implemented by a combination of all types of networks including a LAN such as the Internet and a WAN. Different communication means may be provided between the client terminals 101 to 103 and the print server 104, between the printing devices 105 to 108, and between the print server 104 and the printing devices 105 to 108. The client terminals 101 to 103 are formed from, for example, a desktop personal computer, a notebook personal computer, a smartphone, a tablet personal computer, and the like. The client terminals 101 to 103 each incorporate an environment designed to execute applications and the like including viewer and editor functions capable of executing printing by referring to target documents (document information).

<Hardware Arrangement>

Figure 2:
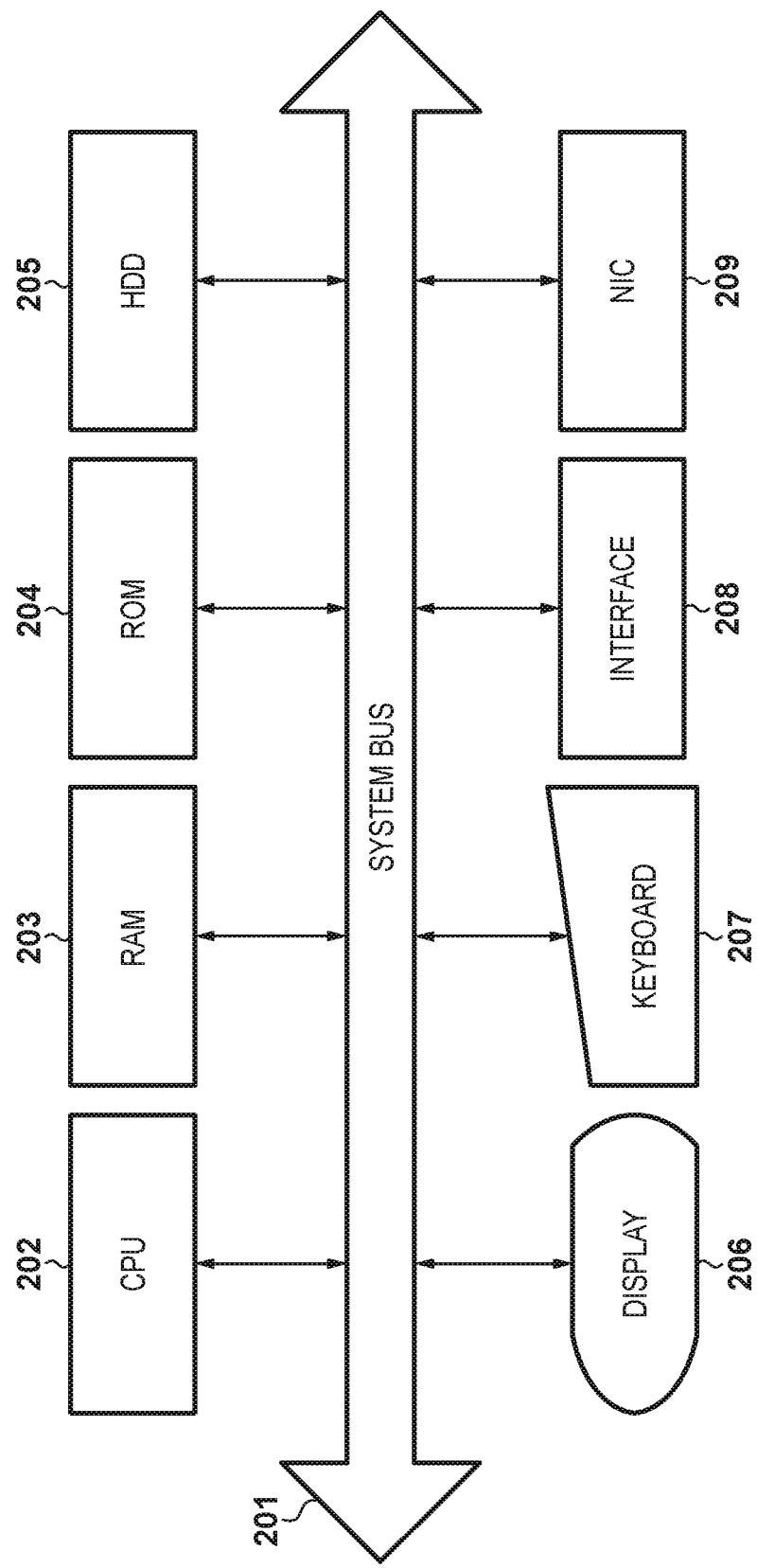
FIG. 2 is a block diagram showing the hardware arrangement of a client terminal and print server.

FIG. 2 is a block diagram showing the hardware arrangement of the client terminals 101 to 103 and the print server 104 in the print system according to the embodiment of the present invention. Referring to FIG. 2, a CPU 202 controls the overall apparatus by executing application programs, an OS (Operating System), and the like stored in a hard disk (HDD) 205. For example, the CPU 202 performs control to temporarily store information and files necessary for the execution of programs in a RAM 203. A ROM 204 stores programs such as a basic I/O program, printing data used in printing processing, and various types of data such as printer information. The RAM 203 is a temporary storage and functions as the main memory of the CPU 202, a work area, and the like. The hard disk (HDD) 205 is one of external storages and functions as a large-capacity memory. The hard disk (HDD) 205 stores application programs such as a document editor, a print server program, an OS, various types of drivers, associated programs, and the like. A display 206 displays an output screen for commands and applications input from a keyboard 207, printer statuses, and the like. An external apparatus I/F 208 is an I/F for connection to a printing device, USB device, or peripheral device. The keyboard 207 is an input means used to input instructions and the like together with a pointing device (not shown). A system bus 201 controls the flow of data in the client terminals and the print server. A NIC (Network Interface Card) 209 exchanges data with an external apparatus via the interface 209 and the networks 109 to 111. Note that the computer arrangement shown in FIG. 2 is an example, and is not limited to the arrangement example in FIG. 2. For example, the storage destinations of data and programs can be changed among the ROM, the RAM, the HDD, and the like in accordance with the features of them.

<System Arrangement>

Figure 3:
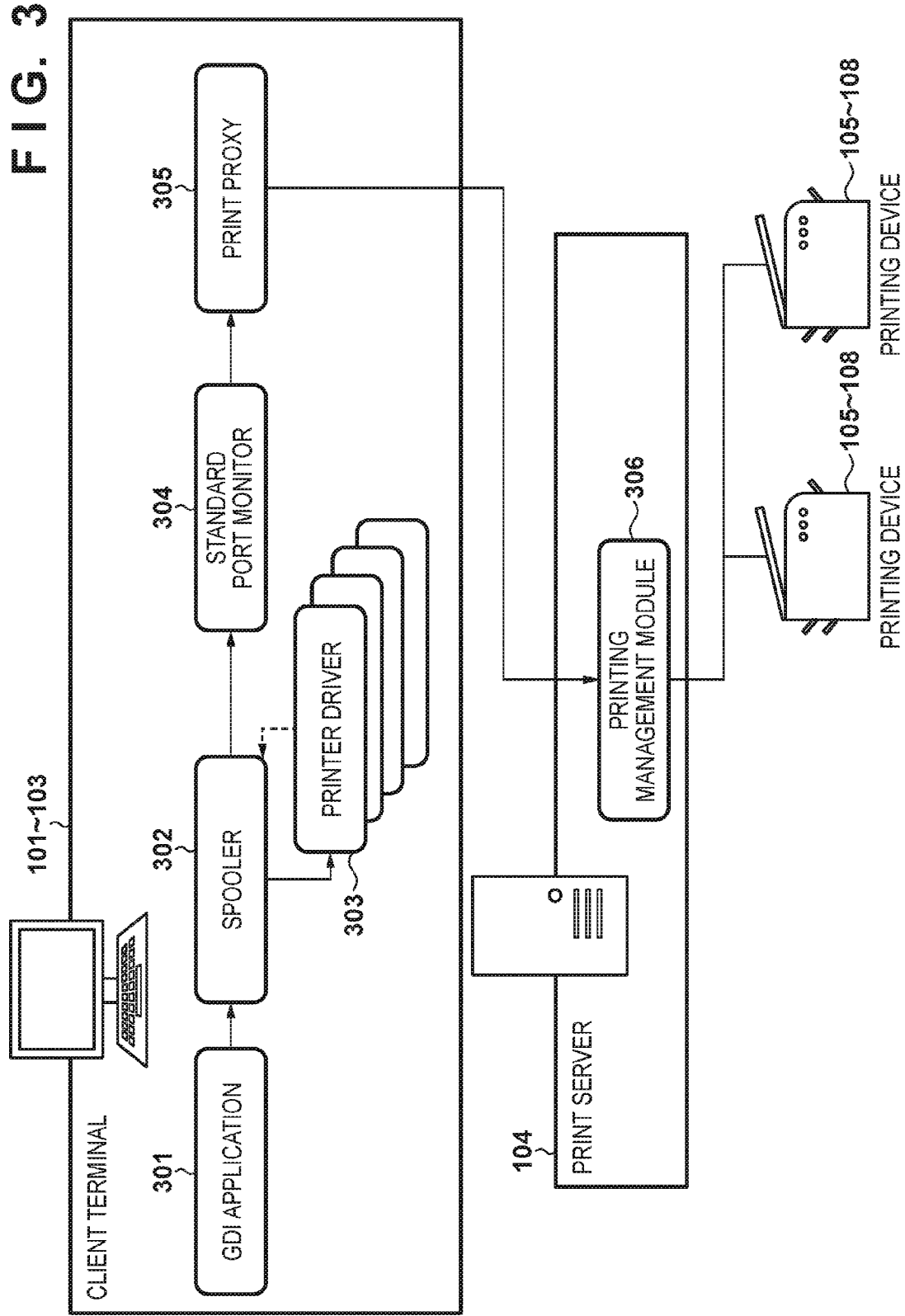
FIG. 3 is a block diagram showing the module arrangements of the client terminal and the print server.

FIG. 3 is a block diagram showing the system arrangement of the print system according to the embodiment of the present invention. Each of the client terminals 101 to 103 includes functional modules including a GDI application 301, a spooler 302, a printer driver 303, a standard port monitor 304, and a print proxy 305.

The GDI application 301 is an application capable of outputting graphical drawing data of a document file to be printed to the display, the spooler 302, or the like. This embodiment is based on the assumption of using an editor application, a document processing application, and the like each having a printing function based on the GDI of the OS. However, this is not exhaustive. It is possible to use another application capable of outputting drawing data to the spooler 302. The GDI application 301 issues a printing instruction to a printer object registered in the OS in advance in accordance with a printing instruction from the user. In this case, the printer object is managed by the spooler 302 and includes printer information 510 (to be described later).

The spooler 302 manages the printer information 510 associated with the printer object and spools printing data. The spooler 302 issues a printing data generation instruction to the printer driver 303 associated with the printer object in accordance with a printing instruction from the GDI application 301. In addition, the spooler 302 acquires virtual printer information 530 on the print server 104 via the print proxy 305, and spools printing data received from the printer driver 303. Furthermore, the spooler 302 transfers the spooled printing data to a predetermined printing port controlled by the standard port monitor 304.

The printer driver 303 generates printing data such as PDL (Page Description Language) data which can be interpreted by the printing devices 105 to 108 in accordance with a request from the spooler 302, and sends the generated printing data to the spooler 302. In this case, printing data generated by the printer driver 303 is data which can include information such as a document name and printing settings and can be interpreted by only one of the printing devices 105 to 108 which corresponds to the printer driver 303 which has generated the data. There are a plurality of types of printer drivers 303 corresponding to the types of printing devices 105 to 108 at output destinations, and one or more printer drivers 303 are installed in the client terminals 101 to 103 in accordance with the types of printing devices 105 to 108 to be used.

The standard port monitor 304 is a port monitor incorporated in the OS as a default. The standard port monitor 304 controls a printing port as an output from the spooler 302 to perform output processing for printing data or issue a request to acquire the virtual printer information 530 with respect to the print proxy 305 in accordance with the type of printing port such as a TCP/IP port. Assume also that the standard port monitor 304 corresponds to a general print protocol and also communicates with the print proxy 305 by using the TCP/IP port in compliance with IPP (Internet Printing Protocol). A communication protocol between the standard port monitor 304 and the print proxy 305 is not limited to IPP but may be any protocol which can implement a processing procedure (to be described later).

The print proxy 305 exchanges printing data or virtual printer information 530 between the client terminals 101 to 103 and the print server 104 by communicating with a printing management module 306 on the print server 104 in accordance with a request from the spooler 302 via the standard port monitor 304. In addition, the print proxy 305 performs extension function processing corresponding to the print server 104, which includes at least one of band limiting control for communication, compression transmission of printing data, retry control, and the like in accordance with transfer setting information 520 (to be described later).

The print server 104 includes the printing management module 306. The printing management module 306 manages the virtual printer information 530 (to be described later) and printing job information 540 (to be also simply referred to as job information) and returns a response in accordance with a request from each of the client terminals 101 to 103 to the print proxy 305. In addition, the printing management module 306 is connected to one or more of the printing devices 105 to 108 which are associated with a virtual printer held in the virtual printer information 530. The printing management module 306 has functions of, for example, transmitting printing data to the associated printing devices 105 to 108 and monitoring the statuses of the printing devices 105 to 108 in accordance with printing requests and the like to the virtual printer.

<Software Arrangement>

Figure 4:
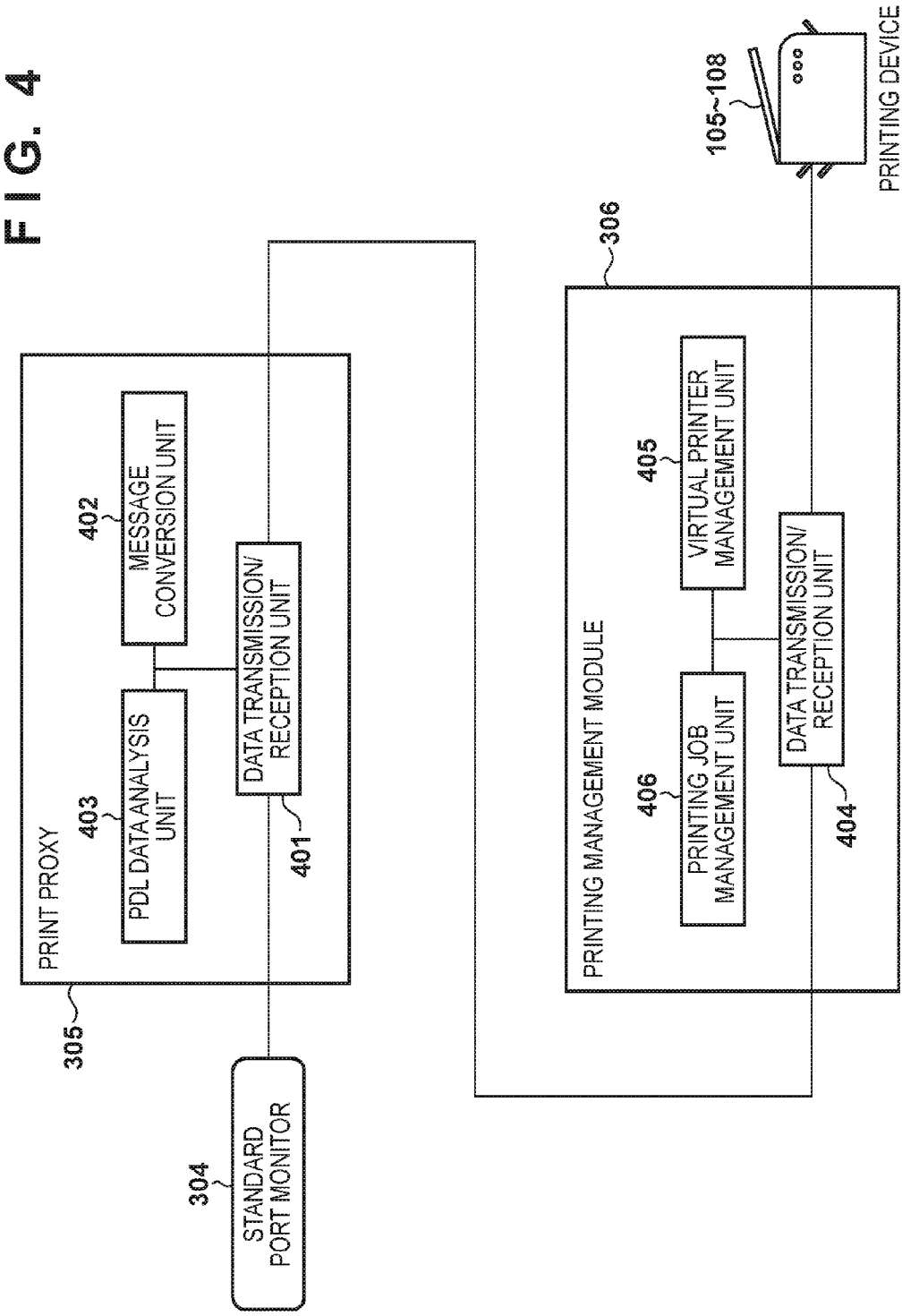
FIG. 4 is a block diagram showing the software arrangements of a print proxy and a printing management module.

The software arrangements of the print proxy 305 and the printing management module 306 which are features of this embodiment will be described. FIG. 4 is a block diagram showing the software arrangement of a print system according to the embodiment of the present invention. Note that the standard port monitor 304 and the print proxy 305 are software located in each of the client terminals 101 to 103, and the printing management module 306 is software located in the print server 104.

A data transmission/reception unit 401 of the print proxy 305 controls communication between the print proxy 305 and the outside. Upon receiving a request message based on IPP from the standard port monitor 304 of the OS, the data transmission/reception unit 401 transfers contents of the request to a message conversion unit 402, receives a request message to the print server 104 as a return, and transfers the message to the print server 104. Upon receiving a response message of a request from the print server 104, the data transmission/reception unit 401 transfers the response message to the message conversion unit 402, receives a response message complying with IPP as a return, and transfers the response message to the standard port monitor 304. When communicating with the print server 104, the data transmission/reception unit 401 performs compression of printing data, network band control, retry processing, and the like in accordance with settings associated with the network in the transfer setting information 520 (to be described later). The data transmission/reception unit 401 can provide an extension function which is not included in standard functions and implement stable communication between the client terminals 101 to 103 and the print server 104 by performing these processes which cannot be implemented by only the standard port monitor 304 using the IPP protocol.

The message conversion unit 402 performs mutual conversion between an IPP message between the print proxy 305 and the standard port monitor 304 and a protocol message between the print proxy 305 and the print server 104. In this embodiment, the print proxy 305 and the print server 104 communicate with each other using an HTTP (Hypertext Transfer Protocol) message by which the print proxy 305 invokes a Web service from the print server 104. This message may be an arbitrary message which can be interpreted by both the print proxy 305 and the print server 104 and can implement each procedure (to be described later). In addition, upon receiving a printing request message from the data transmission/reception unit 401, the message conversion unit 402 transfers the printing data to a PDL data analysis unit 403, and receives information such as a document name and printing settings included in the printing data output from the PDL data analysis unit 403. The PDL data analysis unit 403 includes this information in a request to be sent to the print server 104.

Upon receiving the printing data from the message conversion unit 402, the PDL data analysis unit 403 analyzes the printing data. If the printing data includes information associated with the above job, the PDL data analysis unit 403 extracts the information and returns it to the message conversion unit 402.

A data transmission/reception unit 404 located in the printing management module 306 controls communication between the printing management module 306 and the outside. The data transmission/reception unit 404 receives a request from the print proxy 305, and requests a printing job management unit 406 and a virtual printer management unit 405 to perform processing in accordance with the contents of the request. Upon receiving a virtual printer information acquisition request, the data transmission/reception unit 404 designates the virtual printer name included in the request, sends a corresponding inquiry to the virtual printer management unit 405, and acquires the corresponding virtual printer information 530. Upon receiving a printing job submission request, the data transmission/reception unit 404 transfers the printing job information 540 and the printing data to the printing job management unit 406, and issues a request to register the printing job information 540. In addition, the data transmission/reception unit 404 performs communication between the print server 104 and the printing devices 105 to 108 connected via the networks. The data transmission/reception unit 404 has a function of monitoring the status of printing job under printing and information of the printing devices 105 to 108, for example, state information, and notifying the virtual printer management unit 405 and the printing job management unit 406 of the corresponding information.

The virtual printer management unit 405 manages the virtual printer information 530 (to be described later). Upon receiving an inquiry about the virtual printer information 530, the virtual printer management unit 405 searches the virtual printer information 530 registered in advance for the corresponding virtual printer information 530, and returns it. In addition, upon receiving information of the printing devices 105 to 108, the virtual printer management unit 405 updates the virtual printer information 530 in accordance with the contents of the received information.

The printing job management unit 406 manages the printing job information 540 (to be described later). Upon receiving a printing job submission request, the printing job management unit 406 registers the printing job information 540 with the contents included in the request, and holds printing data associated with the printing job information 540. Upon receiving the printing job information 540 under printing, the printing job management unit 406 updates the printing job information 540 with the contents of the received information.

<Management Information>

FIGS. 5A and 5B each show an example of the arrangement of various types of information managed by the print system according to the embodiment of the present invention. The printer information 510 shown in FIG. 5A is printer object information registered in the OS, which is managed by the spooler 302 on the spooler 302 on each of the client terminals 101 to 103. A printer name 511 is a printer name referred to by the GDI application 301 or the like, and is an identifier which uniquely determines a printer object on the OS. A printer driver name 512 represents the printer driver 303 to be used when issuing a printing instruction to a printer object, and indicates a specific one of the printer drivers 303 installed in the client terminals 101 to 103. A printing port URI 513 represents the output destination of printing data when the corresponding OS printer issues a printing instruction. In this embodiment, the printing port URI 513 includes a destination address indicating the print proxy 305, a port, and a virtual printer name identifying a virtual printer on the print server 104. The destination address of the print proxy 305 is the loopback address of an IP address, and is 127.0.0.1 in this case. This port is also a port assigned for the print proxy 305, and 8000 is designated as an example in FIG. 5A. When this IP address and the port are designated, an output from the standard port monitor 304 is handed to the print proxy 305. In addition, referring to FIG. 5A, for example, "myprinter" is designated as a virtual printer name. A virtual printer name is designated in accordance with a printer. The printer information 510 is registered according to the procedure shown in FIG. 6.

The transfer setting information 520 shown in FIG. 5A is a transfer set value associated with communication with the print server 104, which is held by the print proxy 305 on each of the client terminals 101 to 103. A print server URL 521 represents a reception end point of the print server 104, and represents a destination address to which the print proxy 305 transmits each request. A compression transmission setting 522, a band limitation setting 523, and a retry setting 524 each are a set value with which the print proxy 305 controls communication with the print server 104. The transfer setting information 520 can be determined in accordance with a protocol between the print proxy 305 and the print server 104, and hence can be installed in a client terminal, together with the print proxy 305.

The virtual printer information 530 shown in FIG. 5B is information of a virtual printer which is managed by the printing management module 306 on the print server 104 and registered in the print server 104. A virtual printer name 531 is the name of a virtual printer on the print server 104 and an identifier which uniquely determines the virtual printer information 530. A printing device IP 532 indicates the IP address of one of the printing devices 105 to 108 which is associated with this virtual printer. In addition, a printer driver name 533 is the name of the printer driver 303 corresponding to associated one of the printing devices 105 to 108 and represents that the virtual printer can print printing data generated by the printer driver 303 having the printer driver name 533. The virtual printer information 530 about the printer which can be used by the print system is registered in the print server 104, and can be accessed from one of the client terminals 101 to 103. The virtual printer information 530 may be registered by the same method as that used for a conventional print server. For example, this information may be registered after being acquired by the print server 104 from a new printing device detected on a network or by a manual input operation by an administrator.

The printing job information 540 shown in FIG. 5B is information of a printing job which is managed by the printing management module 306 on the print server 104 and submitted to the print server 104. A printing job ID 541 is an identifier which uniquely determines a printing job on the print server 104. A document name 542 is the file name of a document file on which a printing job designated at the time of submission is based. In this embodiment, as the document name 542, the name of a file printed by the GDI application 301 on one of the client terminals 101 to 103 is set. An output destination virtual printer name 543 is an identifier indicating the virtual printer information 530 associated with the printing job. A PDL data storage destination 544 indicates the storage destination of printing data (PDL data in this case) associated with the printing job. A printing setting 545 is printing setting information of the printing job or the storage destination of printing setting information. Printing job information is registered in the print server 104 according to the procedure shown in FIG. 6.

<Processing Procedure>

FIG. 6 is a sequence chart showing a procedure for generating a printer object on each of the client terminals 101 to 103 and a procedure for submitting a printing job to the print server 104 in the print system according to the embodiment of the present invention.

<Printer Object Generation Sequence 600>

A sequence 600 is a sequence showing a procedure for generating a printer object on each of the client terminals 101 to 103. In step S6001, the spooler 302 receives a printer object generation instruction including the designation of the printer name 511, the printer driver name 512, and the printing port URI 513 in accordance with operation by the user. Upon receiving the printer object generation instruction, the spooler 302 sends a printer information acquisition request based on IPP to the printing port URI 513, designated in step S6001, via the standard port monitor 304 in step S6002. In this case, as described above, the designated printing port URI 513 is a URI including the destination address of the print proxy 305, a port, and a virtual printer name. Note that a printer object is a virtual printer on software which is associated with the printer name 511, the printer driver name 512, the printing port URI 513, and the like. When operating a printer by using a program, a desired operation is implemented by inputting/outputting messages to/from a printer object. The printer object is associated with an actual printer by, for example, the printing management module 306. The actual printer performs an operation in accordance with a message input to the printer object. In this case, printer information associated with one printer included in the printer information 510 is sometimes called a printer object. That is, the printer information 510 includes one or a plurality of printer objects.

The print proxy 305 receives printer information acquisition request via the data transmission/reception unit 401 (step S6002). In step S6003, the message conversion unit 402 extracts a virtual printer name from the printing port URI 513 included as a destination address in the received printer information acquisition request, and converts the virtual printer name into a virtual printer information acquisition request to the print server 104. This request is a request to acquire virtual printer information of a virtual printer having the extracted virtual printer name. After message conversion (step S6003), the print proxy 305 causes the data transmission/reception unit 401 to perform transmission processing of the converted virtual printer information acquisition request with respect to the print server URL 521 by referring to the transfer setting information 520. At this time, the print proxy 305 causes the data transmission/reception unit 401 to communicate with the print server 104 in accordance with the compression transmission setting 522, the band limitation setting 523, and the retry setting 524. For example, data transmitted in accordance with the compression transmission setting 522 is compressed. The compressed data is then transmitted in a band complying with the band limitation setting 523. If there is an error or the like, a retry is attempted in accordance with the retry setting 524.

Upon receiving a virtual printer information acquisition request (step S6004) via the data transmission/reception unit 404, the printing management module 306 issues an information acquisition instruction to the virtual printer management unit 405. In step S6005, the printing management module 306 causes the virtual printer management unit 405 to search the virtual printer information 530 for the corresponding virtual printer information 530 by using the virtual printer name 531 included in the request. In step S6006, the printing management module 306 causes the data transmission/reception unit to return virtual printer information acquired by the search in step S6005 to the print proxy 305.

Upon receiving a response to the virtual printer information acquisition request (step S6006) via the data transmission/reception unit 401, the print proxy 305 causes the message conversion unit 402 to convert the response complying with IPP into a message in step S6007. After message conversion (step S6007), the print proxy 305 transmits the message as a response to the printer information acquisition request (step S6002) from the standard port monitor 304 via the data transmission/reception unit 401 in step S6008.

Upon receiving a response to the printer information acquisition request (step S6008) via the standard port monitor 304, the spooler 302 registers the printer information 510 with the contents contained in the printer object generation instruction (step S6001) from the user in step S6009. The registered printer information 510 is printer information associated with the generated printer object. That is, a new printer object is registered by registering new printer information in the field of the printer information 510. The printer information 510 includes the printing device IP 532 (the IP address of the printing device) acquired from the virtual printer information 530 in addition to the printer name 511, the printer driver name 512, and the printing port URI 513 which are designated by the user. When a printer object is generated on the client terminal, the client terminal can use the corresponding printer.

<Printing Job Submission Sequence 610>

A sequence 610 is a sequence for the processing of submitting a printing job from one of the client terminals 101 to 103 to the print server 104. Upon receiving a printing request including the designation of document data to be printed, the printer name 511 at a printing destination, and printing settings from the user in step S6101, the GDI application 301 issues a printing instruction with the received contents to the spooler 302 in step S6102.

In step S6103, the spooler 302 specifies the corresponding printer object from the printer information 510 by using the printer name 511 included in the received printing instruction, and acquires the printer driver name 512. Upon acquiring the printer object (the printer information 510 of the corresponding printer) (step S6103), the spooler 302 specifies the corresponding printer driver name 512 and issues a printing data generation request to the printer driver 303 in step S6104.

Upon receiving the printing data generation request (step S6104), the printer driver 303 generates PDL (Page Description Language) data as printing data including a document name as the identification information of document data and printing settings, which are included in the printing data generation request, in step S6105. Upon generating the PDL data (step S6105), the printer driver 303 returns the PDL data to the spooler 302 in step S6106.

Upon receiving the PDL data from the printer driver 303 (step S6106), the spooler 302 transmits a printing request to the print proxy 305, with the printing port URI 513 of the target printer information 510 being a destination address, in step S6107. This printing request is an IPP message including PDL data, and is transmitted via the standard port monitor 304. In addition, the spooler 302 completes the printing request to the printer object at the time of the completion of the transmission of the printing request (step S6107), and notifies the GDI application 301 of the completion of the printing request in step S6108.

On the other hand, the print proxy 305 causes the data transmission/reception unit 401 to receive the printing request (step S6107) including the PDL data from the spooler 302 via the standard port monitor 304. Upon receiving the printing request (step S6107), the print proxy 305 causes the PDL data analysis unit 403 to analyze the PDL data to extract information such as a document name and printing settings included in the PDL data in step S6109. In step S6110, the print proxy 305 causes the message conversion unit 402 to generate a printing job submission request to the print server 104 by using the information extracted in step S6109 and a virtual printer name included in the printing port URI 513 which is the destination address of the printing request (step S6107). The generated printing job submission request includes a document name, a virtual printer name, and printing settings in addition to the PDL data. Upon completing message conversion (step S6110), the print proxy 305 causes the data transmission/reception unit 401 to transmit the printing job submission request to the print server 104 in accordance with the set value of the transfer setting information 520 in step S6111.

The printing management module 306 on the print server 104 causes the data transmission/reception unit 404 to receive the printing job submission request from the print proxy 305 (step S6111). In step S6112, the printing management module 306 causes the printing job management unit 406 to issue the new printing job ID 541, and registers the printing job information 540 with information included in the printing job submission request (step S6111). The printing management module 306 also stores the corresponding PDL data and records its storage destination in the PDL data storage destination 544. Upon completing the registration of the printing job information 540, the printing management module 306 returns the notification of printing job submission completion to the print proxy 305 via the data transmission/reception unit 404 in step S6113. Subsequently, the printing management module 306 searches the virtual printer information 530 for a printing device IP address, with the virtual printer name 531 corresponding to the output destination virtual printer name 543 of the newly registered printing job information 540. The printing management module 306 then reads out the PDL data from the PDL data storage destination 544 included in the printing job information 540 and the transmits the PDL data to the printer at the IP address, thereby causing the printer to execute printing.

The print proxy 305 causes the data transmission/reception unit 401 to receive the notification of the completion of printing job submission (step S6113) as a result of the printing job submission request (step S6111). In step S6114, the print proxy 305 causes the message conversion unit 402 to convert the notification (step S6113) into a response complying with IPP. In step S6115, the print proxy 305 returns a printing completion message to the spooler 302 via the standard port monitor 304.

As described above, the method according to the present invention can control communication between the client terminals 101 to 103 and the print server 104 and implement stable communication by providing the print proxy 305 on the subsequent stage of the standard port monitor 304 and making the print proxy 305 convert a printer information acquisition request, a printing request, and the like into request messages. In addition, the method according to this embodiment can implement a print system using the existing printer driver 303 even in a system in which only the standard port monitor operates, without any necessity to tailor the standard port monitor 304 and the printer driver 303.

In addition, for example, it is possible to provide the print proxy 305 with extension functions, such as a function of processing messages for inquiring about the state of a printer and the state of a job, which are difficult for the standard port monitor to implement. This allows the print proxy 305 to implement an extension function by receiving a message via the standard port monitor and issuing an inquiry to the print server 104 or receiving a response in accordance with the message.

Furthermore, it is possible to set the transfer setting information 520 in accordance with a protocol set for the print server 104. This makes it possible to flexibly make settings with respect to the print server.

[Second Embodiment]

The second embodiment will exemplify printing job submission when using a storage-only virtual printer which is not associated with any of printing devices 105 to 108. A storage-only virtual printer is a virtual printer prepared to hold a submitted printing job without immediately printing it. The user can submit a printing job, without registering virtual printer information 530 used by himself/herself on a print server 104 in advance, by designating and submitting a storage-only virtual printer. A storage-only virtual printer is a virtual printer holding no information associated with the printing devices 105 to 108, such as a printing device IP 532 and a printer driver name 533. For this reason, a printing job submitted by the storage-only printer needs to separately hold a printer driver name to specify the virtual printer information 530 which can be used when distributing a printing job from the print server afterward.

<Management Information>

FIGS. 7A, 7B, and 7C are views showing information managed by the print system according to the second embodiment of the present invention. Storage-only virtual printer information 700 shown in FIG. 7A is an example of storage-only virtual printer information registered in virtual printer information 530 managed by a printing management module 306 of the print server 104. In the field of the virtual printer name 531, "saveprinter" as an example of a character string representing a storage-only virtual printer is registered, and no values exist in the fields of the printing device IP 532 and the printer driver name 533. In addition, the storage-only virtual printer information 700 is only required to allow a print proxy 305 and the printing management module 306 to identify the designated virtual printer as a storage-only virtual printer. For example, this technique can also be implemented by a method of providing a new item indicating whether a given virtual printer is a storage-only virtual printer.

Printing job information 710 shown in FIG. 7B is obtained by adding a printer driver name 711 as an item of the printing job information 540 in the first embodiment. Items other than the printer driver name 711 are the same as those of the printing job information 540 described above. The printing job information 710 holds the printer driver name 711 to make it possible to grasp, from the printer driver name 711, a printer driver 303 which has generated the PDL data of each printing job information 710.

Transfer setting information 720 shown in FIG. 7C is held by the print proxy 305. The transfer setting information 720 is obtained by adding a storage-only virtual printer name 721 as an item of the transfer setting information 520 in the first embodiment. Items other than the storage-only virtual printer name 721 are the same as those of the transfer setting information 520 described above. When the print proxy 305 receives a printing request from a spooler 302 (step S6107), the storage-only virtual printer name 721 is referred to determine whether the target (that is, designated by the printing request) virtual printer is a storage-only virtual printer. In this embodiment, "saveprinter" is held as a value, which is the same value as a virtual printer name 531 of the storage-only virtual printer information 700 described above.

<Generation of Storage-Only Printer Object>

For the use of a storage-only virtual printer as well, its printer object is required and generated according to a procedure from step S6001 to step S6010 in FIG. 6 as in the first embodiment. Upon receiving a printer object generation instruction including the designation of a printer name 511 assigned to a storage-only virtual printer, a printer driver name 512 used for the generation of PDL data, and a printing port URI 513 including a storage-only virtual printer name, in accordance with an operation by the user, the spooler 302 acquires the storage-only virtual printer information 700 including these pieces of information designated according to the procedure in FIG. 6, generates a storage-only virtual printer object, and registers it as printer information 510. As a printer driver name to be registered, a designated printer driver name is used. This printer driver is used for conversion to PDL data when generating a printing job to be stored, and is also referred to specify a printer to be used to actually print the stored printing job. Therefore, a storage-only virtual printer object is generated for each printer driver used for PDL conversion.

<Processing Sequence>

Figure 8:
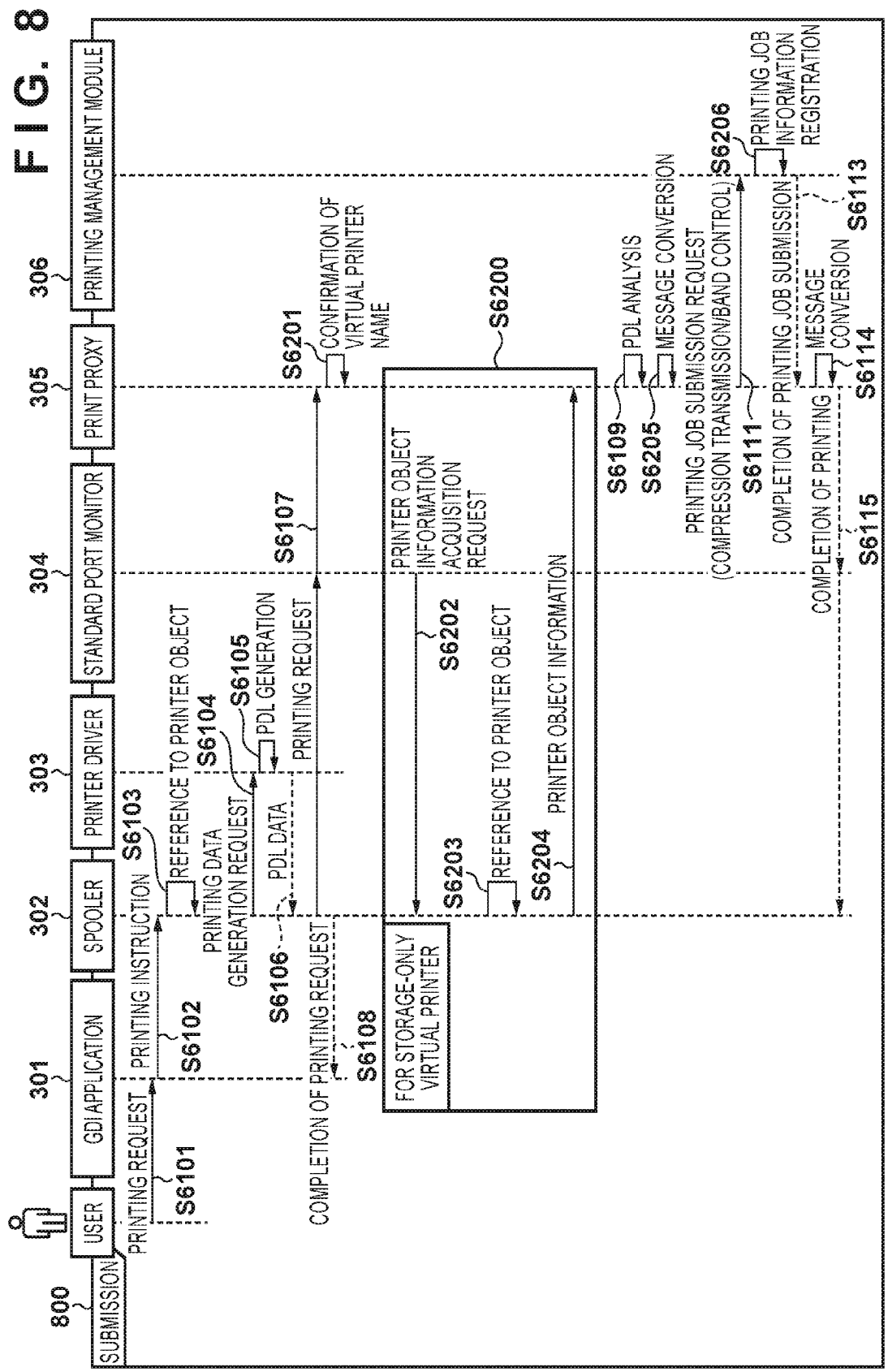
FIG. 8 is a sequence chart showing a procedure for submission processing according to the second embodiment.

FIG. 8 is a chart showing a processing procedure for submitting a printing job to a storage-only virtual printer in the print system according to the second embodiment of the present invention. Processing as a feature of the second embodiment will be described below. Other processing is the same as that in the first embodiment. Referring to FIG. 8, steps S6200 to S6204 are newly added, and steps S6205 and S6206 replace steps S6110 and S6112 in FIG. 6. Differences in processing in these steps from the first embodiment will be mainly described below.

Assume that the user only registers a printing job in the print server 104 without desiring to print. In this case, when, for example, issuing a printing request, the user designates, as a printer name, the printer name of a storage-only virtual printer to be used. Upon receiving a printing instruction from an application 301, the spooler 302 issues a printing data generation request to the printer having the designated name, that is, a printer driver specified by the printer driver name included in the printer information 510 of the storage-only virtual printer to make the printer driver generate document PDL data. The spooler 302 then transmits a printing request including the PDL data to a printing port (that is, the print proxy 305) designated by the printing port URI 513 of the storage-only virtual printer. Upon receiving the printing request (step S6107) from the spooler 302, the print proxy 305 compares the virtual printer name included in the printing port URI 513 as a destination address and the storage-only virtual printer name 721 of the transfer setting information 720 in step S6201. Upon determining that the virtual printer at which the printing request (step S6107) is targeted is a storage-only virtual printer, the print proxy 305 executes step S6200. If the target virtual printer is not a storage-only virtual printer, the print proxy 305 executes step S6109 as in the first embodiment. Step S6200 includes steps S6202 to S6204.

In step S6202, a printer object information acquisition request is transmitted to the spooler 302 via the standard port monitor 304 as a request source. Upon receiving the printer object information acquisition request (step S6202), the spooler 302 returns printer information 510 (that is, the printer information of a storage-only virtual printer) of the printer object using a target printing port in step S6204. The printer information 510 includes a printer driver name used for the generation of printing data (PDL data) as a target for a printing request. Note that a target printing port is a printing port as the transmission destination of the printing instruction request (step S6107). This port can be specified by, for example, an IP address and a port number. The spooler 302 maintains connection to each printing port for each printer object until printing completion 6115, and can specify printer object information corresponding to the printer object information acquisition request from the connection.

When generating a printing job submission request message to the print server 104 in step S6205, the print proxy 305 includes the printer driver name 512 of the printer information 510 received in step S6204 in the printing job submission request message. With this operation, the printing job submission request in step S6111 includes the printer driver name 512 of the printer driver 303 which has generated the PDL data of this printing job. Note that when step S6200 is not executed, the printer driver name field may be blank.

In step S6206, the printing management module 306 causes a printing job management unit 406 to register the printing job information 710 with the contents of the printing job submission request (step S6111). In this case, if the designated virtual printer name is a storage-only virtual printer name, the printer driver name 512 included in the printing job submission request (step S6111) is registered in the printer driver name 711, and the output destination virtual printer name 543 is not registered. With this operation, although the registered printing job information 710 is not associated with the virtual printer information 530, a printer driver which has generated PDL data can be identified. When, therefore, issuing a printing execution instruction for this printing job with respect to the print server 104, the user can properly select a virtual printer which can print.

When, for example, printing a stored printing job, the user acquires a list of registered printing jobs from the print server by using the Web browser or the like of each of the client terminals 101 to 103, displays the list, and selects a printing job to be executed. A printing request is transmitted to the print server 104, together with, for example, the ID of the selected printing job. The print server 104 transfers the printing request to the printing management module 306 via the Web server. The printing management module 306 specifies the printing job information 710 from the printing job ID included in the printing request. If the field of an output destination virtual printer name 543 is blank, the printing management module 306 searches for the virtual printer information 530 with the printer driver name 711. The printing management module 306 executes printing by using a virtual printer including the printer driver name 533 matching the printer driver name 711. Note that if the printer driver name field is blank, the printing management module 306 executes printing by using the output destination virtual printer name 543 according to the same procedure as that in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005289, filed Jan. 14, 2015, which is hereby incorporated by reference herein in its entirety.

What is claimed is:

1. An information processing apparatus which communicates with a print server which manages a printer, the apparatus comprising:
   a memory; and
   a processor in communication with the memory, the processor configured to control an OS (Operating System) and a print proxy for realizing a communication with the print server using a message by HTTP (Hypertext Transfer Protocol):
   wherein the print proxy comprises;
   a receiver configured to receive, via a spooler and a port monitor which supports IPP (Internet Printing Protocol) and is incorporated in the OS as a default, printing data generated by a printer driver corresponding to a printer object managed by information of a virtual printer corresponding to the print server, when performing printing by using the printer object, wherein the receiver receives the printing data as a message by the IPP;
   a specifying unit configured to specify job information including document information from the received printing data;
   a message converter configured to convert a message between a message by the HTTP and a message by the IPP; and
   a controller configured to control transmission of the printing data and the specified job information with respect to the print server, wherein a message by the HTTP according to the message converter is used in the transmission,
   wherein the controller performs at least one of band limitation control of a network between the information processing apparatus and the print server, and retry processing for printing.

2. The apparatus according to claim 1, further comprising an acquisition unit configured to acquire, when a virtual printer at a destination address is a storage-only virtual printer, printer information including a printer driver name associated with the storage-only virtual printer from the spooler, wherein the controller controls transmission of the printing data and the printer driver name.

3. The apparatus according to claim 1, wherein the receiver receives the printing data further via a standard port monitor incorporated in an operating system which manages the information processing apparatus.

4. The apparatus according to claim 1, wherein the controller performs at least one of compression transmission of the printing data, band limitation control of a network between the information processing apparatus and the print server, and retry processing for printing based on preset transfer setting information.

5. The apparatus according to claim 1, wherein when a printer information acquisition request is received from the spooler, a request for corresponding virtual printer information from registered virtual printer information is issued with respect to the print server, and virtual printer information acquired in accordance with the request is transmitted to the spooler.

6. A method performed by a proxy controlled by an information processing apparatus which communicates with a print server which manages a printer, the information processing apparatus controls an OS (Operating System) and the print proxy for realizing a communication with the print server using a message by HTTP (Hypertext Transfer Protocol), the method comprising:

receiving, via a spooler and a port monitor which supports IPP (Internet Printing Protocol) and is incorporated in the OS as a default, printing data generated by a printer driver corresponding to a printer object managed by information of a virtual printer corresponding to the print server, when performing printing by using the printer object, wherein the receiver receives the printing data as a message by the IPP;

specifying job information including document information from the received printing data;

converting a message between a message by the HTTP and a message by the IPP, and controlling transmission of the printing data and the specified job information with respect to the print server, wherein a message by the HTTP according to the message converter is used in the transmission, wherein in the controlling, at least one of band limitation control of a network between the information processing apparatus and the print server, and retry processing for printing is performed.

7. A non-transitory computer-readable storage medium recording a program which causes, when loaded into an information processing apparatus which controls an OS (Operating System) and communicates with a print server which manages a printer and executed, the information processing apparatus to execute a process for realizing a communication with the print server using a message by HTTP (Hypertext Transfer Protocol), the process comprising:

receiving, via a spooler and a port monitor which supports IPP (Internet Printing Protocol) and is incorporated in the OS as a default, printing data generated by a printer driver corresponding to a printer object managed by information of a virtual printer corresponding to the print server, when performing printing by using the printer object, wherein the receiver receives the printing data as a message by the IPP;

specifying job information including document information from the received printing data;

converting a message between a message by the HTTP and a message by the IPP, and controlling transmission of the printing data and the specified job information with respect to the print server, wherein a message by the HTTP according to the message converter is used in the transmission, wherein in the controlling, at least one of band limitation control of a network between the information processing apparatus and the print server, and retry processing for printing is performed.

* * * * *